Patented July 27, 1926.

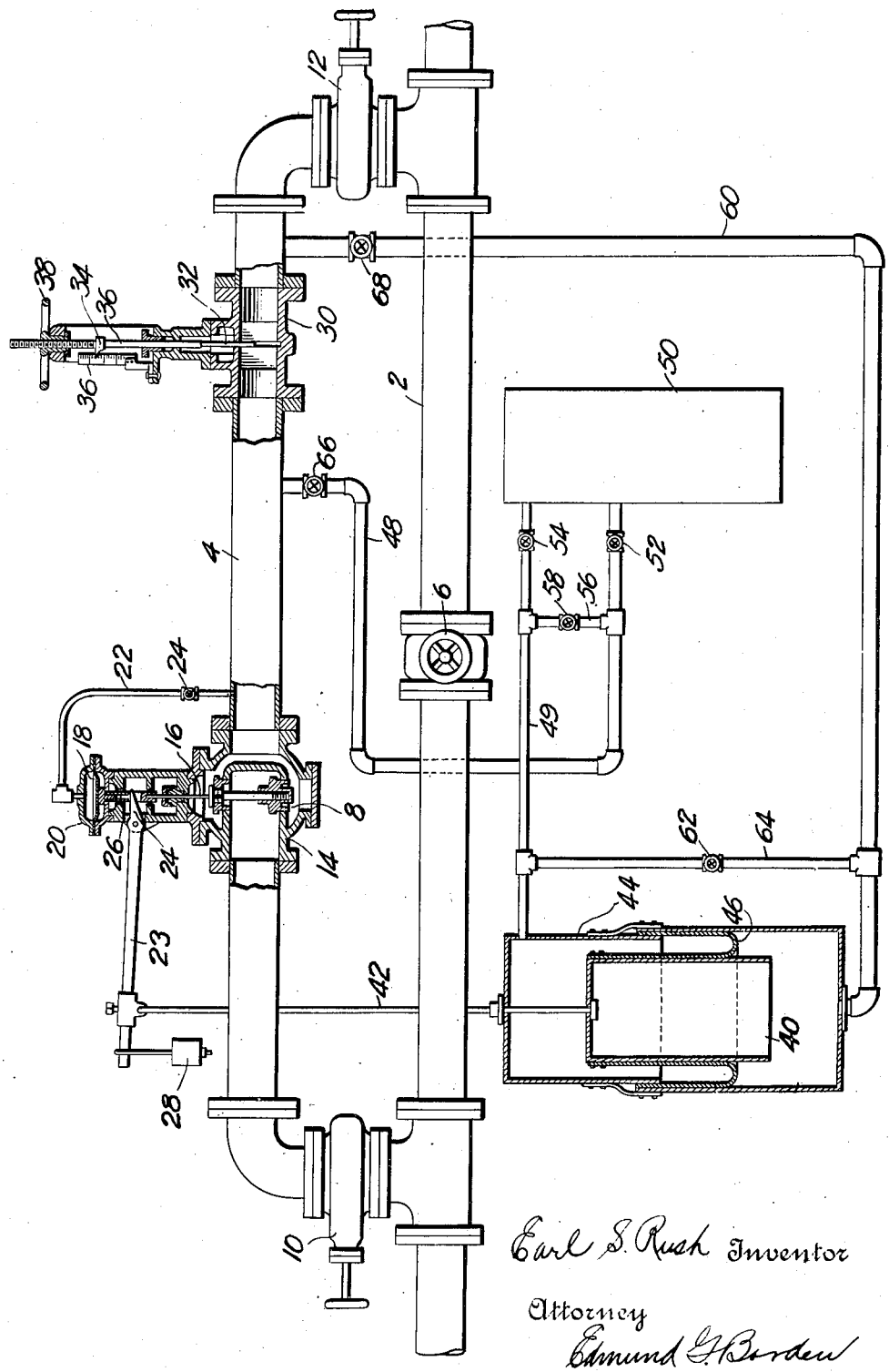

1,593,601

UNITED STATES PATENT OFFICE.

EARL S. RUSH, OF BARTLESVILLE, OKLAHOMA, ASSIGNOR TO DOHERTY RESEARCH COMPANY, OF NEW YORK, N. Y., A CORPORATION OF DELAWARE.

FLUID-CONTROLLING MECHANISM.

Application filed March 7, 1921. Serial No. 450,470.

This invention relates to fluid controlling mechanisms of the type which regulate the pressure at which fluid is delivered from them.

It is a common practice to employ mechanisms of the type above indicated in gas distributing systems to maintain the gas normally at a substantially constant pressure. In the distribution of gas it is of very considerable advantage that the pressure of the gas be kept at the lowest degree which will afford an adequate supply to the consumers. A degree of pressure which would be adequate on other occasions, however, might not permit sufficient gas to be delivered to the service lines during periods of large demand. Consequently, the action of such mechanisms has sometimes been modified at times of large demand to cause the pressure to be increased in order that a large amount of gas may be supplied.

It is an object of this invention to provide an improved fluid controlling mechanism which will normally maintain the fluid delivered from the mechanism at a substantially constant pressure and will cause the pressure of the fluid to be automatically increased when the demand for the fluid is increased.

It is a further object of the invention to provide mechanism for automatically increasing the pressure in a fluid distribution system at times of large demand, which can be applied with little difficulty or expense to fluid regulators of the type commonly employed.

A still further object of the invention involves the provision of means for regulating the pressure in a fluid conductor in accordance with a pressure differential having a definite relation to the rate of flow of fluid through the conductor, the operation of the means for transmitting variations in the pressure differential to the regulating means being dampened to avoid irregular regulation.

In the illustrated construction, which is intended particularly for use in a gas distribution system, the force arising from the pressure differential of the gas at spaced points in the regulator is transmitted to a regulating valve, and the action of the transmitting means is dampened by a surge tank which causes changes in pressure in the line to take effect gradually on the transmitting means and thus avoids irregular regulation due to sudden changes in pressure in the gas lines.

Other objects and features of the invention will appear as the description proceeds and will be pointed out in the appended claims.

A preferred form of the invention is illustrated in the drawing which shows the regulator and its auxiliary apparatus as applied to a high pressure gas line.

As shown, the invention includes a main fluid conductor 2 which may form part of a gas distributing system. A supplementary fluid conductor 4 in the form of a by-pass from the main conductor 2, communicates at its ends with the main conductor at opposite sides of a valve 6. The conductor 4 contains a valve 8 operable to regulate the pressure of the fluid on its outlet side. Adjacent to its ends, the conductor 4 is also provided with valves 10 and 12. Manifestly, if it is desired that all of the fluid shall not be controlled in its flow by the regulating valve 8, the valve 6 may be opened partially or wholly. Also the passage of fluid through the conductor 4 may be discontinued by closing the valves 10 and 12.

The valve 8 is mounted in a casing 14 and, as shown, is in the form of a double poppet valve comprising elements which are arranged to approach closed position when moved downwardly. The stem 16 of the valve extends upwardly and is connected at its upper end to a diaphragm 18 contained in a chamber 20. The chamber 20 is open to the atmosphere below the diaphragm 18 by an opening not shown but is closed above the diaphragm. A pipe 22 having a valve 24 is arranged to transmit the pressure of the fluid in the conductor 4 on the outlet side of the valve 8 to the upper side of the diaphragm 18.

Pivoted on the valve casing 14 is a lever 23 having a heel 24 co-acting with an enlarged portion 26 of the valve stem 16. The lever 23 carries a weight 28 operable to move the valve 8 toward open position in opposition to the pressure of the fluid on the diaphragm 18. The parts hereinbefore described tend in a manner which will be readily understood by those skilled in the art to maintain the fluid on the outlet side of the valve 8 at a substantially constant pressure determined by the weight of the lever 23 and the weight 28.

If the flow of a confined fluid through a conductor is restricted at a point in the conductor, the pressure of the fluid on the delivery side of the point of restriction will be less than that on the supply side. Moreover, the difference in pressure on opposite sides of the point of restriction will increase or decrease as the rapidity with which fluid is withdrawn from the conductor increases or decreases. The present invention is designed to utilize this principle of the flow of fluids to increase the pressure in the conductor 4 on the outlet side of the valve 8 when the demand for the fluid and, consequently, the rapidity of withdrawal of fluid from the conductor 4 increases.

To this end the conductor 4 includes a casing 30 on which is mounted a gate 32. Manifestly, the extent to which flow of fluid past the valve 32 is restricted may be made greater or less by adjusting the valve toward closed or open position. For convenience in properly adjusting the valve 32, a pointer 34 may be carried by the valve stem for coaction with a scale 36 on the casing 30. As shown, the valve 32 may be adjusted by a hand wheel 38 threaded on the stem of the valve.

In order to enable the pressure of the fluid on the outlet side of the conductor 4 to be increased at times of large demand, the regulator lever 23 is connected adjacent to its outer end to a device movable in accordance with the flow of fluid in the conductor 4 as measured by the difference in pressure on opposite sides of the valve 32. In the illustrated construction, such device has the form of a bell 40 connected to the lever 23 by a rod 42. The bell 40 is mounted in a fluid-tight casing 44 which is divided into upper and lower chambers by the bell 40 and a cylindrical diaphragm 46 attached at its ends to the bell 40 and the casing 44. Fluid conducting lines are provided for transmitting the pressure on the supply and delivery sides of the valve 32 to the upper and lower chambers respectively of the casing 44. The bell 40 and diaphragm 46 are impervious to the fluid so that the downward pressure on the bell 40 increases or decreases according as the difference in pressure on opposite sides of the valve 32 increases or decreases.

By reason of the cylindrical form of the diaphragm 46 and the arrangement of the diaphragm between the bell 40 and the casing 44 so that it is supported at one side of its bend by the bell 40 and on the other side by the casing 44, the effective area of the diaphragm is the same in all positions of the parts. Consequently, the force exerted on the valve 8 by the bell 40 and diaphragm 46 is always proportional to the pressure differential caused by the valve 32 regardless of the position of the bell 40.

The line for transmitting fluid pressure to the upper chamber of the casing 44 comprises a pipe 48 leading from the supply side of the valve 32 to a surge tank 50 and a pipe 49 connecting the upper end of the surge tank 50 with the casing 44. The surge tank 50 is adapted to contain a relatively inert body of fluid which responds gradually to changes in pressure in the conductor 4 and thus communicates such changes in pressure gradually to the casing 44. Accordingly, the effect of the surge tank 50 is to dampen the movements of the bell 40. In order further, to control the movements of the bell 40, the pipe 48 is provided with a valve 52 which may be moved toward closed position to restrict the passage of fluid through the pipe in the event that the bell 40 is found to be operating too abruptly. The pipe 49 is also preferably provided with a valve 54. The pipes 48 and 49 may be connected by a pipe 56 containing a valve 58, in order that the surge tank may be by-passed when desirable for repairs or for other purposes.

The line for transmitting fluid pressure from the delivery side of the valve 32 to the lower chamber of the casing 44 comprises a pipe 60. It is desirable under some conditions, for example in setting and testing the apparatus and to avoid rupturing the diaphragm 46 when putting the mechanism into operation, that the pressure in the upper and lower chambers of the casing 44 shall be equalized. This may be effected by opening the valve 62 in a pipe 64 which connects the pipes 49 and 60. The valve 62 is closed during the normal operation of the mechanism.

The pipes 48 and 60 are provided with valves 66 and 68 respectively, which are open during the normal operation of the apparatus, but which are adapted to be closed when desired for repairing or adjustment of the parts.

It will be understood from the foregoing that the force of the differential pressure caused by the valve 32 is communicated to the valve 8 by means of the bell 40, rod 42 and lever 23. Moreover, the movement of the bell 40 downwardly in response to an increase in the differential pressure on opposite sides of the valve 32 is communicated positively to the valve 8. The effect of such movement of the bell 40 is to raise the valve 8 toward open position, in consequence of which fluid is allowed to pass more freely through the valve, thus building up the pressure in the conductor 4 and allowing an increased supply of fluid to be withdrawn from it. In view of the positive connection between the valve 8 and the bell 40, it is important that the bell 40 shall not move too rapidly since, in such an event, the valve 8 would be operated abruptly. This abrupt operation would cause a cumulative action tending to create a higher pressure than desired followed by a period of small flow and lower pressure than desired. This might be called a run-away action and is to be avoided. By means of the surge tank 50 and valve 52, however, the bell 40 may be caused to move so gradually that it will invariably exert a proper influence on the valve 8.

The casing 14 and the parts carried by and directly associated with it, including the valve 8, weighted lever 23, diaphragm 18, and pipe 22 constitute a well known form of pressure regulator. In order to adapt such a regulator to cause the pressure in a system controlled by it to vary in accordance with variations in the demand on the system, it is only necessary, in accordance with the present invention, to tap pipes corresponding to pipes 48 and 60 into the line on opposite sides of a restriction valve and to connect the rod 42 of the differential pressure mechanism to the lever 23. In applying the invention to an old pressure regulating apparatus, it will not ordinarily be necessary to install a separate valve casing 30, inasmuch as such apparatuses generally include such a valve as valve 12 which may be set to produce a drop in pressure in a like manner to the gate valve 32. In such cases the pipes 48 and 60 may be tapped into the line at opposite sides of that valve.

From the foregoing, it will be understood that the invention can be applied to any regulator of the weighted lever type with no alteration of the regulator, the only requirement being that the diaphragm 46 and bell 40 shall be so arranged as to impart to the regulator lever the additional weight required on that particular regulator to produce the desired increase in pressure when the flow of fluid through the regulator is increased.

The ideal regulation of the pressure in a gas main in a city distributing system is one in which the minimum pressure is always maintained at the most remote end of the gas distributing line, in such a way that all of the consumers upon the line between the regulator and the most remote point will be supplied with sufficient gas at a minimum pressure to meet their requirements. If the pressure builds above this minimum pressure at all points along the line, there will be excess losses in the line, due to leakage. By means of the pressure regulating mechanism illustrated in the drawings, the conditions outlined above are maintained from one control house without the necessity of measuring or controlling the regulation in accordance with the pressures in the distributing line at the remote point, or at any point between the remote point and the regulator.

This regulation is accomplished by setting the weight 28 on the constant pressure regulator 8, so that the minimum pressure at the remote end of the line will be maintained at the outlet side of the regulator when no gas is flowing through the line. This pressure, of course, may be slightly higher than the pressure desired at the remote end of the line, due to the friction of the gas distributing line. When there is no gas flowing in the line, if the pressure builds above the predetermined minimum, it will act upon the diaphragm 18 to close the double poppet valve 8. At this time there is no flow through the differential valve 32, and therefore the regulation is entirely accomplished by the constant pressure regulator 8.

As the flow through the line increases and a pressure differential is developed on opposite sides of the valve 32, the pressure differential acting through the bell 40 will modify the action of the main regulator 8 to cause it to deliver sufficient gas, so that the minimum pressure will be maintained at the remote end of the line. The valve 32 may be so set that at maximum demand the gas line pressure at the remote end of the line will be slightly higher than the minimum pressure normally maintained at that point in order to assure a sufficient flow of gas to meet unexpectedly large demands. The regulating apparatus, therefore, has the main regulator 8 and the pressure differential regulator 32 and 40 both operating to maintain a predetermined minimum pressure at the remote end of the line, and in all cases this regulation depends upon the flow of gas through the line, which is measured at the valve 32.

Having thus described the invention, what is claimed as new is:

1. In a fluid controlling mechanism, a fluid conductor, a valve for controlling the flow of fluid through the conductor, means tending normally to cause the valve to maintain the fluid on the outlet side of the valve at a substantially constant pressure, a device operable in accordance with a difference in pressure at spaced points in the conductor to vary the pressure of the fluid on the outlet side of the valve, and means for dampening the action of said device.

2. In a fluid controlling mechanism, a fluid conductor, means for controlling the flow of fluid through the conductor so as normally to maintain a constant pressure on the outlet side of the conductor, means for causing a local drop in pressure in the conductor, a device for varying the pressure of the fluid on the outlet side of the conductor in accordance with the difference in pressure on opposite sides of the pressure reducing means, and a surge tank for dampening the action of said device.

3. In a fluid controlling mechanism, a fluid conductor, a valve for controlling the flow of fluid through the conductor, a loaded member operatively connected to the valve for moving it toward open position, means for communicating the pressure of the fluid on the outlet side of the valve to the valve in a manner tending to move it toward closed position, means for causing a local drop of pressure in the conductor, a movable device, means for transmitting the pressure on opposite sides of the pressure-reducing means to opposite sides of said device, and mechanical connections between the device and the loaded member.

4. In a fluid controlling mechanism, a fluid conductor, a valve for controlling the flow of fluid through the conductor, means for causing a local drop in pressure in the conductor, a movable device, means for transmitting the pressures on opposite sides of the pressure reducing means to opposite sides of the device, a surge tank in the transmission means for dampening the action of the device, and connections between the device and the valve, tending to move the valve in accordance with the difference in pressure occasioned by the pressure-reducing means.

5. In a fluid controlling mechanism, a fluid conductor, a valve for controlling the flow of fluid through the conductor, means tending normally to cause the valve to maintain the fluid on the outlet side of the valve at a substantially constant pressure, means for causing a local drop in pressure in the conductor, a movable device, means for transmitting the pressure on opposite sides of the pressure-reducing means to opposite sides of the said device, a surge tank for dampening the movements of the device, and positive connections between the device and the valve for moving the valve toward open position in synchronism with a movement of the device in order to cause the pressure on the outlet side of the valve to be increased upon increase in the differential pressure on opposite sides of the pressure-reducing means.

6. In a fluid controlling mechanism, a fluid conductor, a valve for controlling the flow of fluid through the conductor, means tending normally to cause the valve to maintain a substantially constant pressure on the outlet side of the valve, differential pressure mechanism positively connected to the valve and operable in response to changes of the pressure of the fluid on the outlet side of the valve, and means for dampening the action of said mechanism.

7. In a fluid controlling mechanism, a fluid conductor, means acting normally to maintain the fluid on the outlet side of the conductor at substantially constant pressure, a casing, a device mounted in the casing, connections between said device and said means for causing the pressure of the fluid to be raised upon movement of said device, means for causing a local drop in pressure in the conductor, a fluid conducting line for transmitting the pressure of the fluid on the low pressure side of the pressure-reducing means to the casing at one side of the device, a fluid conducting line for transmitting the pressure of the fluid on the high pressure side of the pressure-reducing means to the casing on the other side of the device, a surge tank in the last-mentioned line for dampening the movements of the device, and a valve for adjustably restricting the passage of fluid from the conductor to the surge tank.

8. In a fluid controlling mechanism, a fluid conductor, a valve for controlling the flow of fluid through the conductor, a member tending to operate the valve toward open position, means for communicating the pressure of the fluid on the outlet side of the valve to the valve in a manner tending to move the valve toward closed position so as normally to maintain a constant pressure on the outlet side of the valve, means for causing a local drop in pressure in the conductor, a casing, an impervious device mounted in the casing, a fluid conducting line arranged to transmit the pressure on the low pressure side of the pressure-reducing means to the casing on one side of said device, a fluid conducting line arranged to transmit the pressure on the high pressure side of the pressure-reducing means to the casing on the other side of the device, a surge tank in the last-mentioned line for dampening the movements of said device, and connections between the device and the valve operating member arranged to cause the pressure on the outlet side of the valve to be built up when the difference in pressure on opposite sides of the pressure-reducing means is increased.

9. In a device of the class described, a fluid conductor, a valve for controlling the passage of fluid through the conductor, means tending normally to cause the valve to maintain the fluid on the outlet side of the valve at a substantially constant pressure, means for causing a local drop of pressure in the conductor, means for transmitting the force of the pressure differential on the opposite sides of the pressure-changing means to the valve to increase or decrease the pressure of the fluid on the outlet side of the valve when the pressure differential is increased or decreased, and means for dampening the action of the pressure transmitting means to prevent sudden movements of the valve due to abrupt changes of pressure in the fluid conductor.

10. In a device of the class described, a fluid conductor, a valve for controlling the passage of fluid through the conductor, means tending normally to cause the valve to maintain the fluid on its outlet side at a substantially constant pressure, means for causing a local drop in pressure in the conductor, and means for transmitting to the valve a force proportionate to the pressure differential on opposite sides of the pressure-changing-means regardless of changes in the position of the transmitting means.

11. In a device of the class described, a fluid conductor, a valve for controlling the passage of fluid through the conductor, means tending normally to cause the valve to maintain the fluid on its outlet side at a substantially constant pressure, means for causing a local drop in pressure in the conductor, a casing, a bell in the casing, connections between the bell and the valve, fluid conducting lines for transmitting the pressure on opposite sides of the pressure-reducing-means to the casing, and a cylindrical diaphragm connected at one of its ends to the bell and at its other end to the casing between the points of connection of the fluid conducting lines therewith, said diaphragm being so arranged with relation to the bell and the casing that the effective area of the diaphragm is the same in all positions of the bell so that the force communicated to the valve is always proportionate to the pressure differential caused by the pressure-reducing means.

In testimony whereof I affix my signature.

EARL S. RUSH.